(12) United States Patent
Lin

(10) Patent No.: US 8,529,242 B2
(45) Date of Patent: Sep. 10, 2013

(54) FORMING MACHINE FOR FABRIC SLATS

(75) Inventor: Sheng-Ching Lin, Taipei (TW)

(73) Assignee: Chang Chun Enterprise Co., Ltd., Taipei (TW)

( * ) Notice: Subject to any disclaimer, the term of this patent is extended or adjusted under 35 U.S.C. 154(b) by 523 days.

(21) Appl. No.: 12/940,707

(22) Filed: Nov. 5, 2010

(65) Prior Publication Data

US 2012/0064183 A1    Mar. 15, 2012

(30) Foreign Application Priority Data

Sep. 14, 2010  (TW) ............................... 99130976 A

(51) Int. Cl.
*B29C 43/52*    (2006.01)

(52) U.S. Cl.
USPC .......................... 425/385; 425/407; 425/411

(58) Field of Classification Search
USPC ................ 425/193, 384, 385, 394, 395, 403, 425/406, 407, 408, 411, 412, 415
See application file for complete search history.

(56) References Cited

U.S. PATENT DOCUMENTS 4,711,005 A * 12/1987 Chang .......................... 425/384
2007/0023962 A1    2/2007 Jelic et al.

FOREIGN PATENT DOCUMENTS

| TW | 079107755 | 2/1992 |
| TW | 081202945 | 6/1992 |
| TW | 081202945 | 2/1993 |

* cited by examiner

*Primary Examiner* — Richard Crispino
*Assistant Examiner* — Thukhanh Nguyen
(74) *Attorney, Agent, or Firm* — Muncy, Geissler, Olds & Lowe, PLLC

(57) ABSTRACT

A forming machine for fabric slats provides a strip material to be formed with hot ironing and cold ironing according to temperature in a complete procedure of hot working, wherein an entire surface of the strip material is contacted and the strip material moves linearly. The forming machine stably forms a slat of a curved cross section and includes a hot ironing module and a cold ironing module which are assembled as a linear hot-working assembly. The fabric strip impregnated with an adhesive agent is fed in at an end of the hot-working assembly through a feed device. The strip material is first thermally fused and ironed with surface contact when passing through the hot-working assembly and then is executed with cold ironing and shaping, thereby stably forming the slat of the curved cross section, which is outputted from a take-up device at the other end of the hot-working assembly.

12 Claims, 11 Drawing Sheets

FORMING MACHINE FOR FABRIC SLATS

BACKGROUND OF THE INVENTION a) Field of the Invention

The present invention relates to a forming machine for fabric slats, and more particular to a forming machine which enables a thermoplastic strip of fabric to be hot ironed with contact on an entire surface thereof, in a linear motion and in a whole procedure, for largely removing a deformation stress, as well as to be cold ironed and re-shaped, wherein temperature in the procedure can be exchanged gradually, such that structures of elements can be dislocated sequentially for stable deformation, thereby shaping the slat of a curved cross section.

b) Description of the Prior Art

For a blind curtain used for shading from light, especially a horizontal blind which is formed by joining a series of slats, the slats are required to have upright mechanical strengths to defy gravity that they can be constructed on the horizontal blind for use. The slats can be made by natural wood or bamboo, or can be even shaped by aluminum or a plasticized board material. The abovementioned materials are light impermeable or their refraction surfaces are optically cold and dull after refraction; therefore, a mood of gradation is unable to be manifested. Accordingly, there is provided with a blind set using draperies to shade from light. In addition to that a semi-transparent effect of this blind set can provide part of refraction light, sensuousness of textures is able to be discriminated as the textures of fabric are supported by outdoor background light; this is an ancient culture of the blind and is difficult to be replaced.

In earlier days, there were vendors who utilized a woven fabric which is dipped in a plasticized adhesive agent to form a slat for use after drying, in order to allow the horizontal slats to be partially light permeable, replace the materials to convert an economic benefit, as well as manifest the more enriched textures and coloration. After the woven fabric has been constructed on the blind set, the partial light permeability can be achieved and the textures of fabric are discriminated.

As the early technologies are not perfect, an improved technology is being actively developed for high production speed and serving as a basis of applicability. In 1990, a Taiwanese vendor has filed a patent application, No. 79107755, which claims a technology of formulating compositions of an impregnated substance (i.e., the plasticized adhesive material) of a fabric Venetian blind (i.e., the horizontal slats) and a vertical blind. In this patent, the fabric is first impregnated with the adhesive agent, allowing pores and surface of the fabric to fully adsorb the adhesive agent. Next, after an operation of tension adjustment, the fabric is heated up and compressed on a shaping machine to result in the fabric slat that is impregnated with the adhesive agent. This fabric can be used in the horizontal or vertical slat.

Through the abovementioned patent, it is known that by dipping the fabric in the plasticized adhesive agent and utilizing a structural force of solidification of the plasticized material, the fabric can be supported to be used for the horizontal slat. In addition, this patent has also disclosed a concept of hot-work shaping.

An explicit operation technology of the abovementioned hot-work shaping was disclosed in 1992 by a Taiwanese vendor who filed a patent application, No. 81202945, which is an apparatus for forming the fabric slat. As shown in FIG. 13, the apparatus includes a heating tank which is connected at an upstream end with molding tool for forming at a downstream end. A strip of fabric is fed into the heating tank by another set of guide rollers and an output end of the molding tool is provided with a set of rubber rollers to take up the fabric strip. From the drawings and texts, the heating tank is an empty tank unit having a chamber. Furthermore, in the summary of the invention, a top of the heating tank is sealed by a cover plate and the strip that enters is suspended in air or cut, allowing a surface of the fabric strip to be softened by heating. The heating process is only for softening and shape styling is not implemented until the fabric strip enters into the molding tool at the downstream end.

After the abovementioned patent has been issued, another amended technology was filed for application, as in the patent application, No. 81202945A01, which claims a closed heating box heated by electrothermal tubes. In this invention, the fabric in the heating box travels along an S-shaped path and therefore, the heating path is extended that the fabric can be softened uniformly only after heating for a long time. In addition, the heating process is like baking, where the fabric is heated up with spatial separation.

In 2006, a U.S. patent application, Ser. No. 11/459,529 was filed and was published in 2007 with No. US2007/0023962A1. This patent discloses a method and an apparatus for forming fabric slats. In the claims, the method is implemented by the apparatus which includes a first driven roller to pull a strip material, an elongated heat chamber through which the strip material can pass and be thermally softened, a cooling station downstream from the heat chamber, an elongated support of an arcuate transverse cross section extending through the heat chamber to support the strip material, and a second driven roller for pulling the strip material through the heat chamber and the cooling station.

The heating means as described by the abovementioned patent utilizes a heat chamber which is an elongated hollow tube as described in claim 3. In claim 4, the heat chamber is provided with a closure system at each end, with a slot through which the strip material can pass. In claim 5, a pre-heat section is provided at an upstream end of the heat chamber and in the summary of invention, that pre-heat section is known to preheat the chamber body not the fabric. In claim 7, a scraper having an arcuate opening is provided on the arcuate surface of the support. Accordingly, by the texts and drawings, it can be clearly known that the heating means utilizes a chamber and the so-called chamber is a space with a room. Therefore, the fabric is heated up by a thermal radiation wave; this is a heating method with spatial separation and is similar to the Taiwanese patent application No. 81202945. During thermal melting, thus, the fabric is not styled and the implementation of styling (curved cross section) is based upon that in a processing line of the cooling station, a mechanical force of scraping and compressing is exerted onto the softened strip material which travels through a gap between an upper surface of the support and the arcuate opening of the scraper. Besides, the scraper is a piece of plate and a void space between the two scrapers allows cold air to directly blow onto the upper surface of the strip material to dissipate the heat.

The abovementioned design provides a solution of continuous forming operation to quickly shape the fabric, which has been accomplished with the adhesion process, into the slat with the arcuate curve.

In the implementation of the two abovementioned prior arts, it can be clearly seen from the texts and drawings that the strip material is heated up with spatial separation by the heat wave, allowing the entered strip material to be softened, so as to prepare for the subsequent operation of shaping and styling. In other words, the shaping operation only relies on the elements provided by the subsequent cooling station and during the heating process, only the strip material itself is self deformed by softening, with the gravity acting as the external force for deformation.

SUMMARY OF THE INVENTION

The primary object of the present invention is to provide a forming machine for fabric slats, wherein during hot and cold forming processes, a strip material (fabric) is executed in a complete procedure with hot and cold ironing, with an entire surface of the strip material being contacted and compressed and uniform heat exchange being resulted on the entire surface thereof, so as to stably shape into a slat of a curved cross section without scratches or wrinkles by pushing or compression on a surface thereof. In the present invention, a hot ironing module and a cold ironing module are used and the two are serially connected in an order to result in a linear hot-working assembly. An interior of the hot-working assembly is longitudinally provided with a narrow through-slot having a cross section for making a curve, allowing the thermoplastic strip of fabric to pass through. The thermoplastic strip of fabric is first hot ironed and then cold ironed. By serially connecting the hot ironing module with the cold ironing module and forming the through-slot which penetrates the hot-working assembly longitudinally, during the complete procedure of hot-working received by the strip material, the entire strip material can receive mechanical ironing on the entire surface continuously, thereby stably forming and quickly producing the slat of a curved cross section.

A second object of the present invention is to provide a forming machine for fabric slats, wherein a feed-in end of the abovementioned hot-working assembly is provided with a dispensing device to dispense the strip material. The dispensing device is provided with a tension detector which utilizes a mount to detect a change of diameter of a feed roll by a pure mechanical action, in order to determine a torque against a pivot by that change of diameter, thereby maintaining a constant dispensing speed of the strip material or changing the dispensing speed.

A third object of the present invention is to provide a forming machine for fabric slats, wherein other than differences of temperature and order of arrangement, the hot ironing module and the cold ironing module constituting the hot-working assembly can have the same appearance, dimensions and synchronous linking relation, in order to simplify the manufacturing procedure of the hot-working assembly and reduce a backlog requirement in mass production.

A fourth object of the present invention is to provide a forming machine for fabric slats, wherein the hot ironing module or the cold ironing module is formed by combining in pairs of two sets of an upper mold block and a lower mold block, and the through-slot is formed in an abutting interface respectively after pairing, along a same direction of a traveling path of the strip material. The through-slots, each of which is formed by the two upstream and downstream mold blocks respectively, are aligned and assembled as a linear through-slot. The linear through-slot which is assembled can form a surface contact with a surface of traveling strip material to exchange hot and cold temperature. Depending upon a magnitude of the temperature, the upper mold block or the lower mold block can be divided into a first heat conduction zone and a second heat conduction zone, with that the temperature of the first heat conduction zone is smaller than that of the downstream second heat conduction zone, such that during the shaping process, the change of the temperature and the shaping of the strip material can be effected gradually.

A fifth object of the present invention is to provide a forming machine for fabric slats, wherein a raw element of a target to be formed can be a thermoplastic plasticized material, with that hot-working temperature thereof depends upon material properties. Therefore, the hot-working assembly of the present invention can be configured to be temperature adjustable and time of heating can be changed with a displacement speed of the strip material by synchronously modulating a feed-in device and a take-up device.

A sixth object of the present invention is to provide a forming machine for fabric slats, wherein as the strip material of hot-working can be thin or thick depending upon the material properties, a relative gap between the upper mold block and the lower mold block of the hot-working assembly is set as adjustable, with the adjustment being achieved by linking with a lifting mechanism.

A seventh object of the present invention is to provide a forming machine for fabric slats, wherein heat energy used by the hot ironing module can be produced by an electrothermal element or by serially connecting with fluid of thermal oil; whereas, heat energy of the cold ironing module can be obtained by exchanging heat with cold water or fluid of refrigerant which is serially connected. An interior of the thermal oil or cold water can be further added with a boosting agent to increase a rate of heat exchange, such as heat-carrying metal particles or ethylene glycol.

An eighth object of the present invention is to provide a forming machine for fabric slats, wherein a shear wheel of the feed-in device is provided with a conjugate curve, allowing the strip material, which has been mechanically compressed in advance, to be pre-deformed.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

The forming machine for fabric slats of the present invention provides a relative motion in which the strip material is executed continuously by hot ironing and cold ironing with contact on an entire surface of the strip material, depending upon temperature, so as to stably form the slat of a curved cross section. As the entire surface of the strip material is pressed with cold-working and hot-working in the process, the required curve from ironing can be truly shaped.

Figure 1:
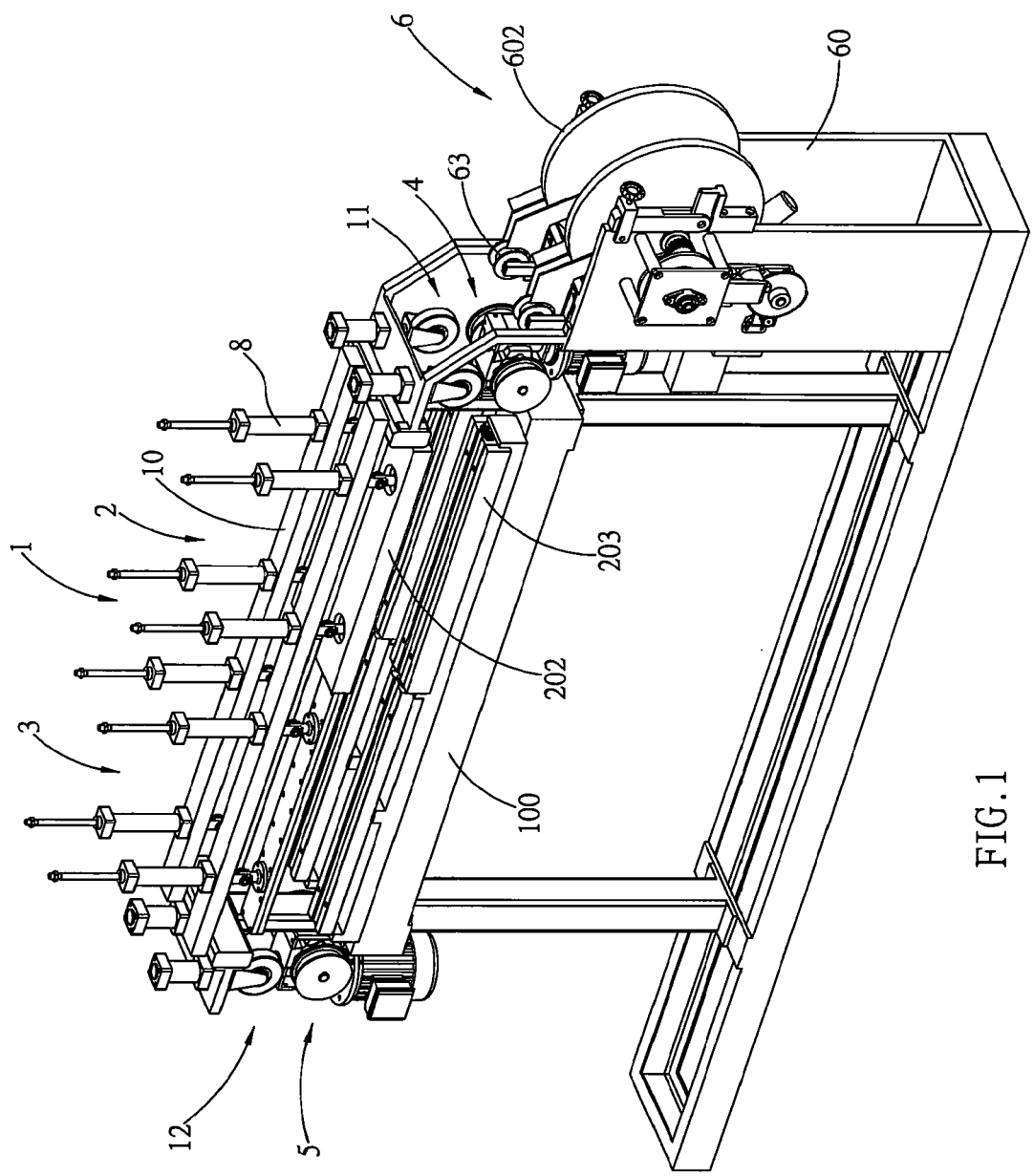
FIG. 1 shows a three-dimensional perspective view of a forming machine of the present invention.
Figure 2:
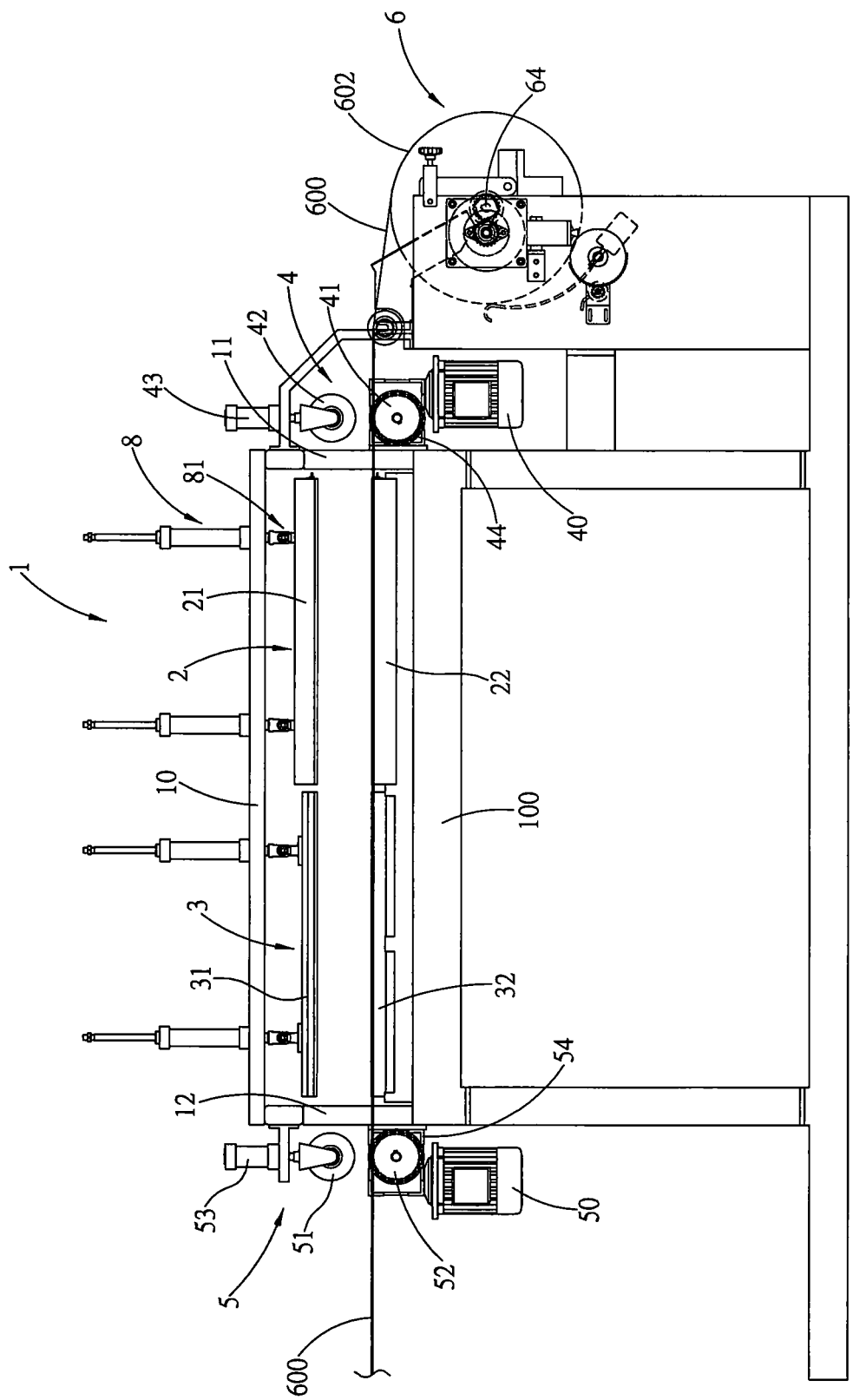
FIG. 2 shows a front view of the present invention.

Referring to FIG. 1 and FIG. 2 (along with FIG. 9), the forming machine of the present invention comprises primarily a linear hot-working assembly 1 which is pairing into a top and bottom part during preparation. An interior of the hot-working assembly 1 is arranged longitudinally with a linear and narrow through-slot 13, an upstream end of which is aligned with a feed-in opening 11 and the other end of which is aligned with a take-up opening 12. The feed-in opening 11 is engaged outward with a feed device 4, the take-up opening 12 is engaged outward with a take-up device 5, and the feed device 4 is engaged outward with a dispensing device 6.

The hot-working assembly 1 is constituted by serially connecting a hot ironing module 2 and a cold ironing module 3 from upstream to downstream linearly and is installed above a platform 100, wherein the hot ironing module 2 is provided with a first upper mold block 21 and a first lower mold block 22 and the cold ironing module 3 is provided with a second upper mold block 31 and a second lower mold block 32. As the hot ironing module 2 is serially connected with the cold ironing module 3, the first upper mold block 21 of the hot ironing module 2 is also aligned and serially connected with the second upper mold block 31 of the cold ironing module 3 and the first lower mold block 22 of the hot ironing module 2 is similarly aligned and serially connected with the second lower mold block 32 of the cold ironing module 3. The first lower mold block 22 and the second lower mold block 32 are linearly aligned and provided above the platform 100; whereas, the first upper mold block 21 and the second upper mold block 31 are provided below a rack 10. In addition, each of the first upper mold block 21 and the second upper mold block 31 can be linked synchronously with a lifting mechanism 8 to displace upward and downward and the first upper mold block 21 and the second upper mold block 31 are similarly aligned linearly.

The abovementioned second upper mold block 31 is formed by pairing upstream and downstream the hot-ironing module 2 and the cold-ironing module 3. The hot-ironing module 2 is provided with the first upper mold block 31 and the first lower mold block 22. Similarly, the cold-ironing module 3 is provided correspondingly with the second upper mold block 31 and the second lower mold block 32.

After pairing the first upper mold block 21 with the first lower mold block 22 and pairing the second upper mold block 31 with the second lower mold block 32, the interfaces formed will constitute respectively a hot and cold through-slot at an upstream and downstream end. After linearly aligning the hot and cold through-slots, an elongated linear hot-work forming through-slot 13 will be formed.

The feed device 4 is assembled at an exterior side of the feed-in opening 11 and drives a shear wheel 41 through a drive unit 40. The shear wheel 41 is clamped by a clamp wheel 42 which displaces upward and downward by a push device 43 to adjust a clamping force of the clamp wheel 42 to the shear wheel 41; whereas, the drive unit 40 is assembled at a side of the platform 100 through a machine box 44. The take-up device 5 is similarly provided with a drive unit 50 which is assembled at the other side of the platform 100 through a machine box 54; whereas, the drive unit 50 drives a shear wheel 52 and an upper end of which is clamped by a clamp wheel 51. The clamp wheel 51 displaces upward and downward by a push device 53 to adjust a clamping force of the clamp wheel 51 to the shear wheel 52; whereas, a change of the clamping force determines tension of a strip material 600 itself between the feed device 4 and the take-up device 5. The lifting mechanism 8 moves upward and downward to position the strip material 600 prior to entering into the hot-working assembly 1 and the upward and downward displacement of the lifting mechanism 8 is in accordance with thickness of the strip material 600; the lifting mechanism 8 does not need to move when the strip material 600 enters into the hot-working assembly 1 for hot-working. In addition, the lifting mechanism 8 is assembled with the first upper mold block 21 and the second upper mold block 31 by elbow joining with a working end 81.

To continuously access the strip material 600, the feed device 4 is outward assembled with the dispensing device 6 which will dispense the strip material 600. The strip material 600 is fed in through the feed device 4, is thermally formed by the hot-working assembly 1 and then retracted by the take-up device 5. A following work after retracting by the take-up device 5 can be ordinary cutting, punching or packing in a whole row. As the subsequent equipment is an ordinary apparatus, further description is not provided.

In principle, the feed device 4 and the take-up device 5 operate at a same speed and along a same direction. In implementation, however, for the strip material 600 entering into the hot-working assembly 1 to be straight, a running speed of the take-up device 5 can be a little larger than that of the feed device 4. Hence, by that speed difference, the take-up device 5 can be aligned with the strip material 600 of the hot-working assembly 1 and pull the strip material 600 at a single end, such that the strip material 600 can be straight. According to a test by the present inventor, the speed difference is about 2%.

The dispensing device 6 is supported by a seat 60 which can be connected relatively with the platform 100. The dispensing device 6 is installed above the seat 60 and can be radially assembled with a feed roll 602 which is constituted by the strip material 600 through a rotatable support shaft 64. Furthermore, the strip material 600 can be released into the hot-working assembly 1 along a radial direction of the support shaft 64.

Figure 5:
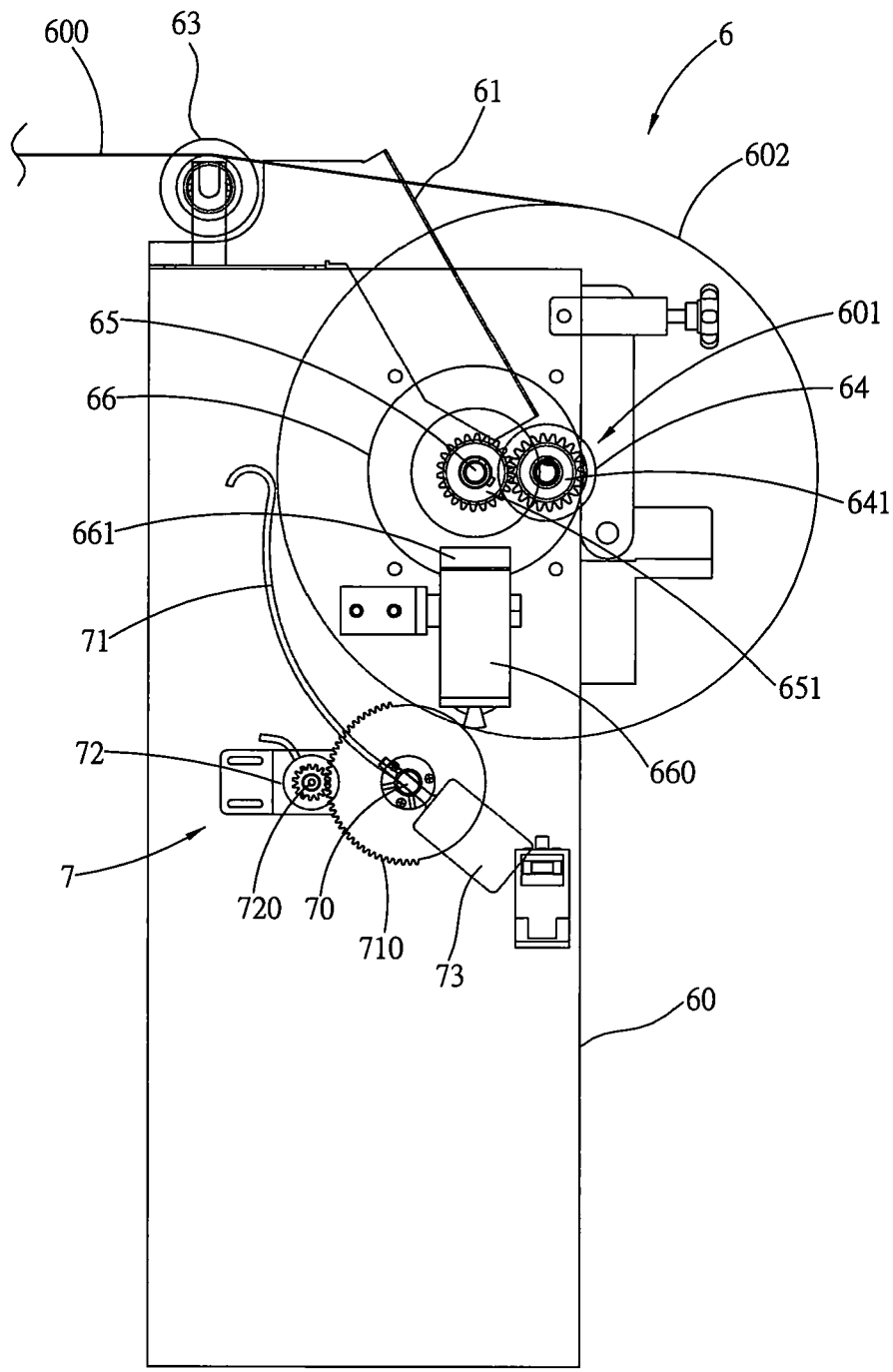
FIG. 5 shows a front view of a dispensing device with respect to a sensor unit, according to the present invention.

A relationship of linear speed of the strip material 600 with respect to the driving of the abovementioned dispensing device 6 and feed device 4, as well as a portion from the feed device 4 to the take-up device 5, includes a dispensing section from the strip material 600 that is dispensed by the feed roll 602 to a place before the feed device 4 and a hot-working section from the feed device 4 to the take-up device 5. The entire power distribution is primarily based upon the drive unit 40 of the feed device 4 and a working speed of the take-up device 5 is a little larger than that of the feed device 4 by about 1-2% (according to a surface friction factor of the material); whereas, the dispensing device 6 should satisfy dispensing the strip material 600 to the feed device 4 and under a condition that the dispensing device 6 is passive, the dispensing device 6 will be drawn by the feed device 4. To maintain the tension of the strip material 600 in the dispensing section, a dispensing speed of the dispensing device 6 is controlled by a sensor unit 7 (as shown in FIG. 5).

Figure 3:
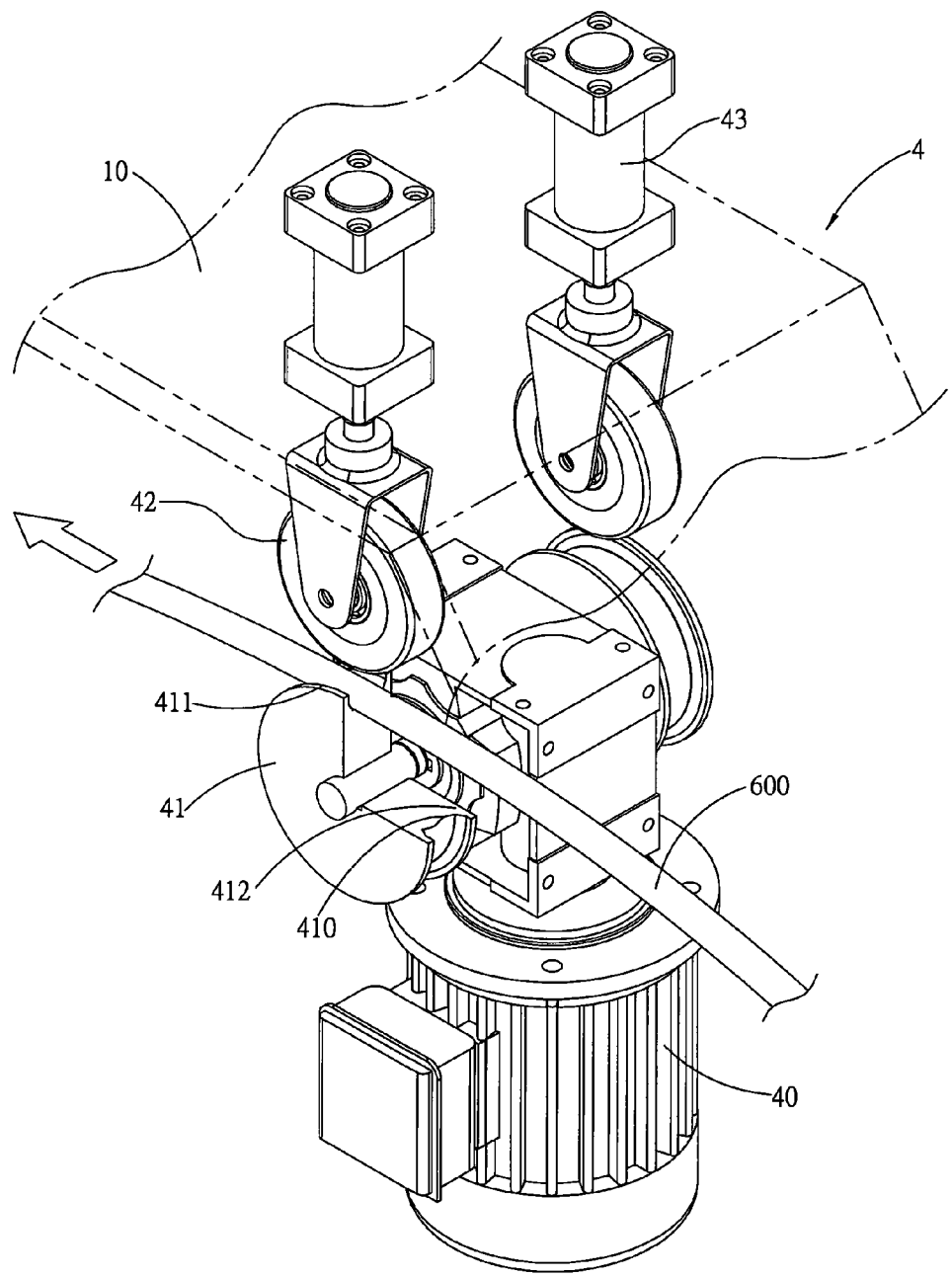
FIG. 3 shows a three-dimensional structural schematic view of a feed-in device of the present invention.

Referring to FIG. 3 (along with FIG. 2 and FIG. 9), the feed device 4 feeds and drives the strip material 600, using the clamping force on a wheel surface between the clamp wheel 42 and the shear wheel 41 to control the linear speed of the strip material 600. The clamp wheel 42 of the feed device 4 displaces upward and downward by the push device 43 and supports linearly the upward and downward displacement; whereas, the push device 43 can be fixed on the rack 10. The shear wheel 41 of the feed device 4 is driven by the drive unit 40 and two sides of the wheel surface of the shear wheel 41 are provided with side carriages 411, 412 (protrusions at side ends of the wheel surface), forming a groove on the wheel surface of the shear wheel 41 that the wheel surface of the clamp wheel 42 can enter and be clamped. The side carriages 411, 412 prohibit a longitudinal breadth of the strip material 600 from derailing and the clamp wheel 42 controls whether the strip material 600 rolls in a full amount, under a restriction of the push device 43; the control is also designed according to the surface friction force of the strip material 600.

The feed device 4 of the present invention is further utilized that the wheel surface 410 of the shear wheel 41 is provided with a curve which fits with a cross section of the abovementioned through-slot 13. The curve is formed by symmetrically rotating a curved line against a shaft and the clamp wheel 42 can be also provided with a curved wheel surfaces which is male-female symmetric. Or, the clamp wheel 42 can be provided with an elastic rubber surface which is deformed by pressure. When the wheel surface is pressed on the curved wheel surface 410 of the abovementioned shear wheel 41, a shearing function of a same curvature will be executed to the previous flat-shaped strip material 600 that is gnawed. On the other hand, the strip material 600 is previously set and shaped by dipping the strip fiber into an adhesive agent and is thus provided with hardness. Accordingly, after gnawing through the abovementioned curved wheel surface 410 of shear wheel 41 and the clamp wheel 42, a binding force of plasticized molecules, which are impregnated with the adhesive agent and are shaped, is forcefully and mechanically damaged, such as rupture, leaving behind a linking force of fiber yarns; whereas, the fiber yarns are flexible and not provided with a mechanical force of support.

A forcefully ruptured line resulting from the abovementioned rolling occurs at a position of the maximum radian of the curve and is formed longitudinally on the strip material 600. In addition, since the binding force of the plasticized molecules has been already damaged and ruptured, a restoring force of re-binding is lost. At this time, the strip material 600 will be deformed obediently in dry and as the plasticized molecules were ruptured, there is no residual of the deformation stress.

When the strip material 600 enters into the hot ironing module 2, after being deformed by forcefully rolling, the plasticized molecules will be excited by heat mass of the hot ironing module 2 to form a hot melting function during the hot-working process, enabling the ruptured gels to be hot melted again. In the process, by the restriction of the curve of the through-slot 13, the plasticized material of the strip material 600 at hot-working will be wandering around and distributed from the curve. Therefore, there is already no resistant stress in the hot-working process. Besides, the strip material 600 is in contact with the hot-working assembly 1 on the entire surface in the complete procedure of hot ironing, allowing the strip material 600 to be fully restricted by the hot ironing module 2 during the hot-working process of the hot ironing module 2.

After the hot-working of the hot ironing module 2, the strip material 600 will enter into the cold ironing module 3 between which and the hot ironing module 2 is connected with the through-slot 13. Heat mass is exchanged by the cold ironing operation of the cold ironing module 3, facilitating the strip material 600 to be formed and styled, thereby achieving a stably formed product.

Regarding to the concept of cold forming, any normal substance is shrunk at cold to result in an issue of contraction stress. However, an appropriate demand can be made depending upon the condition of the plasticized material and the magnitude of dipping.

A conjugate curved surface is formed by the wheel surface of the abovementioned shear wheel 41 and the clamp wheel 42 and a dry mechanical force is first implemented to forcefully shear and deform the strip material 600, such that the strip material 600 can be deformed in advance to accomplish the object of forming; this can remove a large part of the deformation stress to fully facilitate the subsequent stability of forming.

Figure 4:
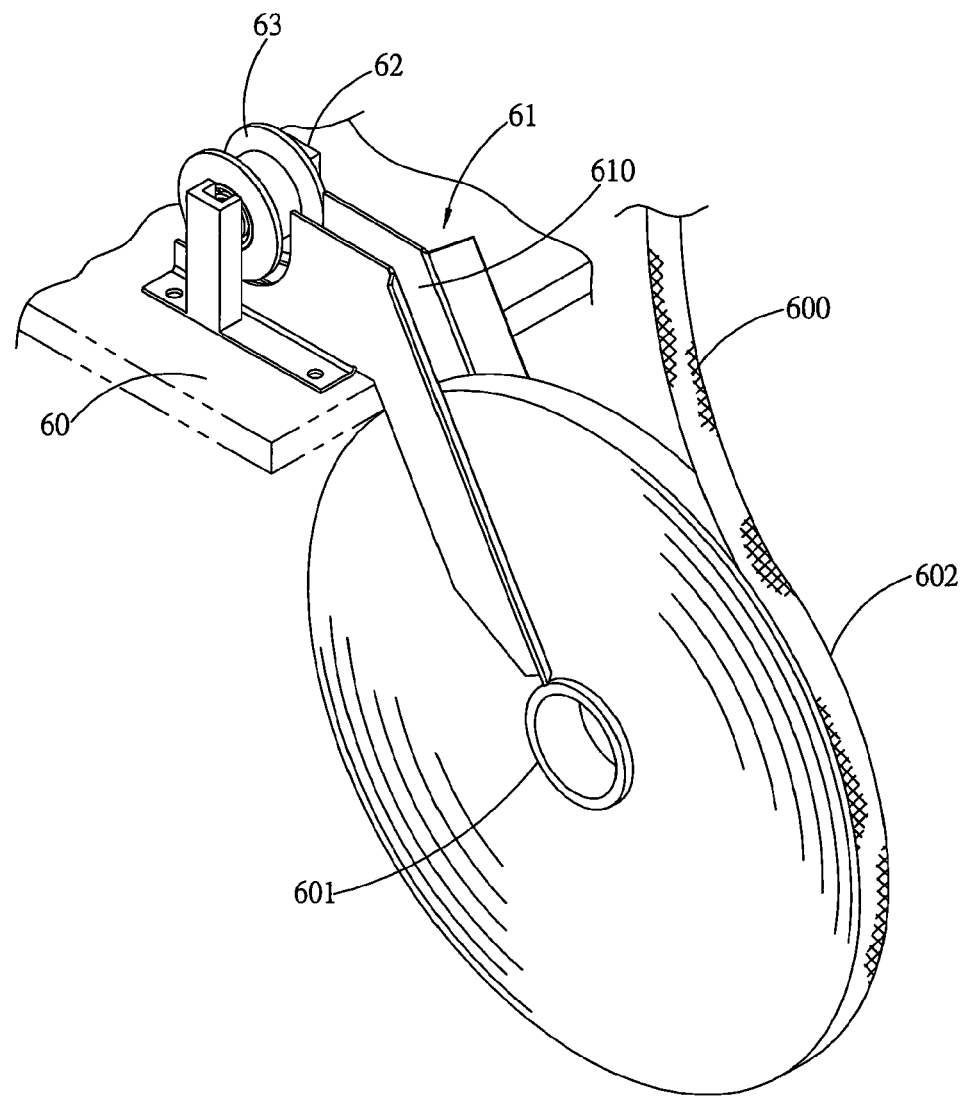
FIG. 4 shows a schematic view of alignment and assembling of a plate gauge of the present invention.

Referring to FIG. 4, it shows a plate gauge 61 in a shape of a rabbet. End surfaces at two sides of the feed roll 602 can be supported by inner surfaces at inner rims of the rabbet, allowing the strip material 600 to be dispensed out through a dispensing wheel 63. The dispensing wheel 63 and the plate gauge 61 are assembled on a wheel seat 62 which is in turn assembled at a corresponding position above the seat 60. By a clamping function of the plate gauge 61, an end surface of the feed roll 602 will not be dislocated and width of the rabbet 610 of the plate gauge 61 is a little larger than thickness of the feed roll 602. As kinetic friction exists between the rabbet 610 and the feed roll 602, the two end surfaces of the feed roll 602 can be supported. A center of the feed roll 602 is supported by a beam-barrel 601, forming the feed roll 602 by rolling the raw strip material 600.

Figure 6:
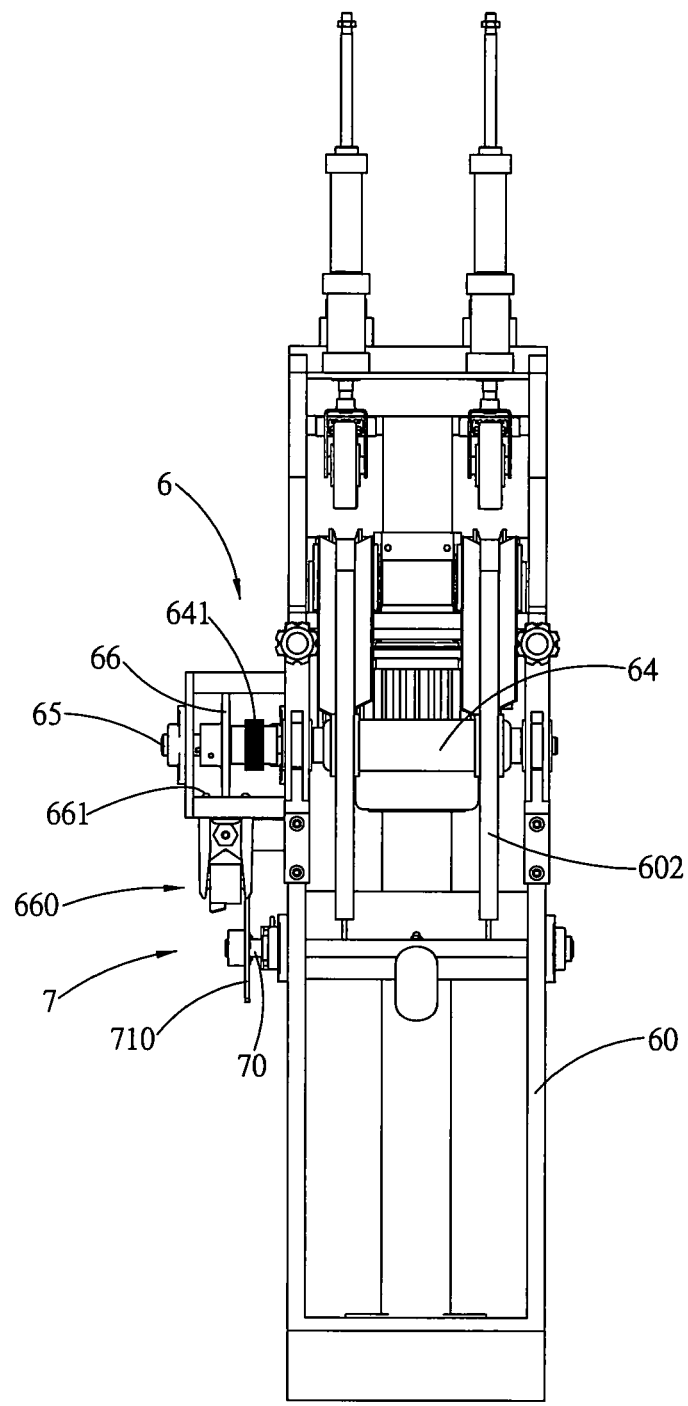
FIG. 6 shows a side view of a platform of the present invention.

Referring to FIG. 5 (along with FIG. 6), the beam-barrel 601 of the feed roll 602 is sheathed on the support shaft 64 of the dispensing device 6 and is radially assembled with the support shaft 64. When the support shaft 64 rotates, the feed roll 602 rotates to release the strip material 600. On the other hand, if the support shaft 64 does not rotate, then the feed roll 602 cannot rotate either. Tension of a line segment from the strip material 600, which is outputted by the feed roll 602, to the feed device 4 (as shown in FIG. 1), has to be controlled, as demanded by density or condition of the material. In addition, a quantity of dispension should be met. The method of the present invention for controlling the tension of that line segment is to provide a link gear 641 at an input end of the support shaft 64, with that the link gear 641 gnaws a passive gear 651 which is coaxially connected with a brake disc 66. The passive gear 651 and the brake disc 66 are coaxial against a pintle 65, forming a passive method. The brake disc 66 is clamped by a lining 661 of a clamp device 660 to achieve a detent effect which will reversely connect to the link gear 641. As the link gear 641 and the support shaft 64 are coaxial, a rotation speed of the feed roll 602 can be tuned relatively to change a traveling speed of a line segment of the strip material 600 between the feed roll 602 and the link gear 641; whereas, that change alters the tension of that line segment synchronously.

The clamping operation of the clamp device 660 to the brake disc 66 is controlled by an instruction of the sensor unit 7. The sensor unit 7 is an apparatus which can detect a change of diameter of the feed roll 602 and is provided with an offset probe 71. A tail end of the probe 71 is attached on an outer circumference of the feed roll 602 and contacts tangentially. Therefore, the probe 71 is aware of a decrease of the diameter of the feed roll 602, forming an offset displacement. That offset displacement will activate a rheostat 72 to change resistance and a signal of the resistance change will be provided to the sensor unit 7 as a notification of a working condition of the clamp device 660.

The probe 71 is supported by a pivot 70 and the other end of the probe 71 can be provided with a weight block 73 which is suspended by gravity. The pivot 70 is coaxially connected with a link element 710 which is a large gear, with a wheel surface gnawing a passive element 720. The passive element 720 is a gear of smaller diameter and is coaxially connected with the rheostat 72 which is in a shape of a spindle. Therefore, when the passive element 720 is driven to rotate, it will drive the rheostat 72 to change the resistance and result in an angular momentum using the link element 710 which is driven by the offset of the probe 71. In addition, as the link element 710 is provided with the larger diameter, an angular change of the passive element 720 will be enlarged after the link element 710 has been driven, such that the rheostat 72 can access the specific angular change, thereby transmitting the accurate resistance change and enabling the sensor unit 7 to serve as a reference of sending the instruction.

Figure 7:
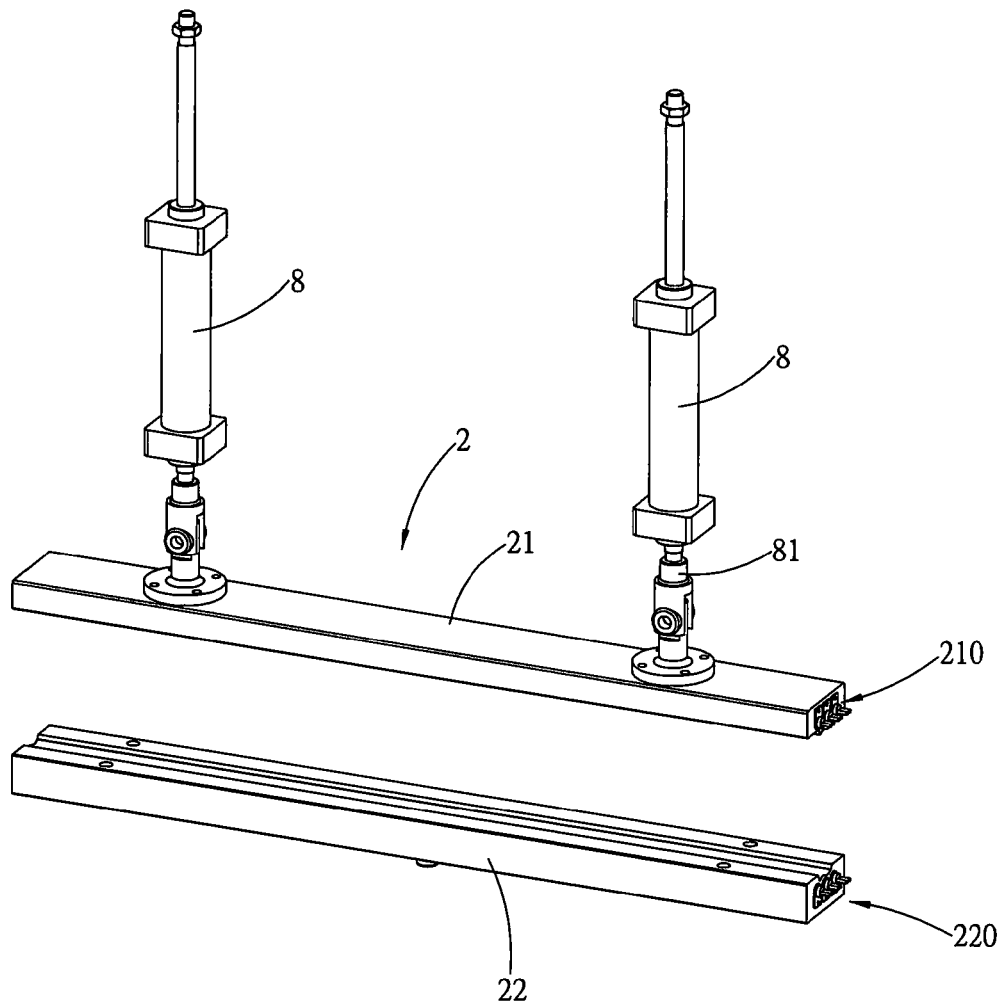
FIG. 7 shows a three-dimensional view of a structure relation of a hot ironing module of the present invention.

Referring to FIG. 7 (along with FIG. 2), the hot ironing module 2 provided by the present invention is constituted by the first upper mold block 21 and the first lower mold block 22 which are clamped in a pair. The first upper mold block 21 and the first lower mold block 22 are provided respectively with a coupling end 210, 220 to connect outward with heat or an energy source. An upper side of the first upper mold block 21 is elbow jointed with the working end 81 of the lifting mechanism 8, which can have two, to determine a linear relationship, allowing the first upper mold block 21 and the first lower mold block 22 to be opened or closed as a pair in a parallel direction.

Figure 8:
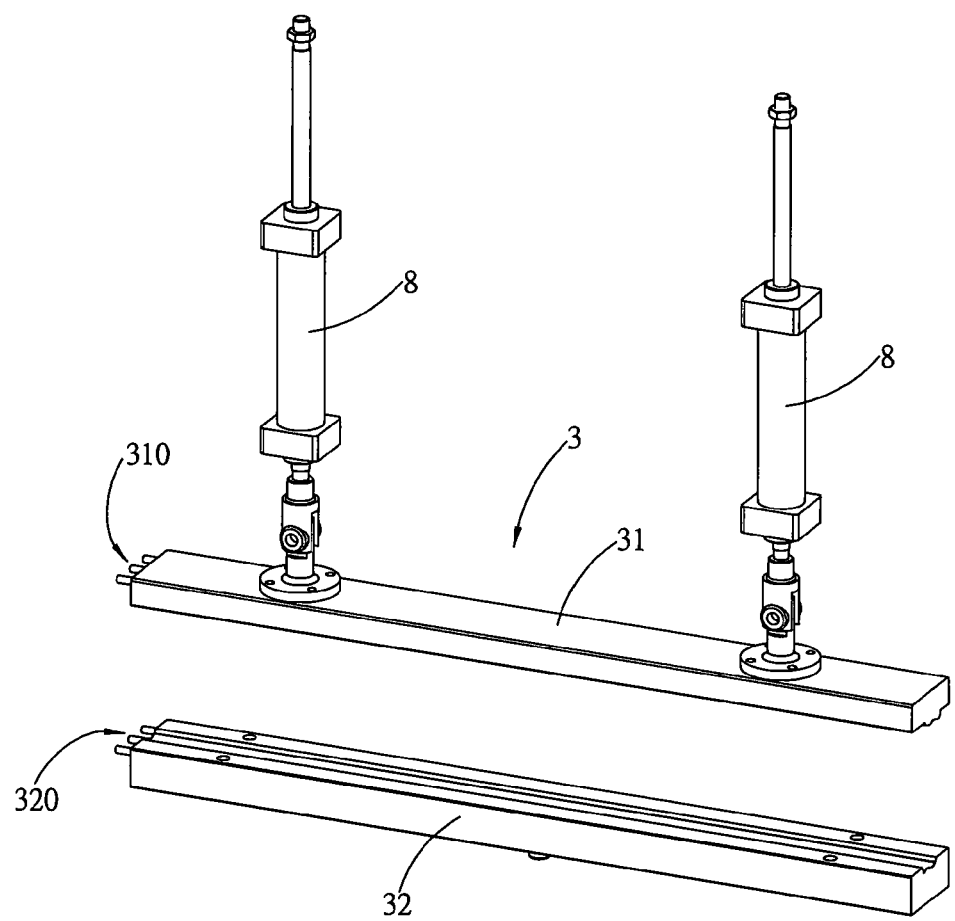
FIG. 8 shows a three-dimensional view of a structure relation of a cold ironing module of the present invention.

Referring to FIG. 8 (along with FIG. 2), the cold ironing module 3 is constituted by pairing the second upper mold block 31 with the second lower mold block 32. An end of the second upper mold block 31 and the second lower mold block 32 is provided with a coupling end 310, 320 and each of which connects outward to an energy medium or an energy source. The second upper mold block 31 displaces upward and downward in a parallel direction through the lifting mechanism 8 and the parallel function acts to the second lower mold block 32.

Referring to FIG. 9 again, when the first upper mold block 21 and the first lower mold block 22, as well as the second upper mold block 31 and the second lower mold block 32, provided by the hot ironing module 2 and the cold ironing module 3 in the abovementioned FIGS. 7 and 8, have been paired, a condition as shown in a side view of FIG. 9 will be formed. The first upper mold block 21 and the second upper mold block 31 are provided respectively with a first male rail 211 and a second male rail 311; whereas, the first lower mold blocks 22 and the second lower mold block 32 are provided respectively with a first female slot 221 and a second female slot 321. The first upper mold block 21 and the second upper mold block 31 are synchronously driven by ascending or descending of the lifting mechanism 8 (as shown in FIG. 2) and the operation will finally form the linear and narrow through-slot 13 between the first male rail 211 and the first female slot 221 or between the second male rail 311 and the second female slot 321. The longitudinal through-slot 13 is provided with a curved cross section and as described above, a gap height of the through-slot 13 is determined by the upward or downward displacement of the lifting mechanism 8 and is adjusted according to the thickness of the strip material 600 (as shown in FIG. 2).

Figure 10:
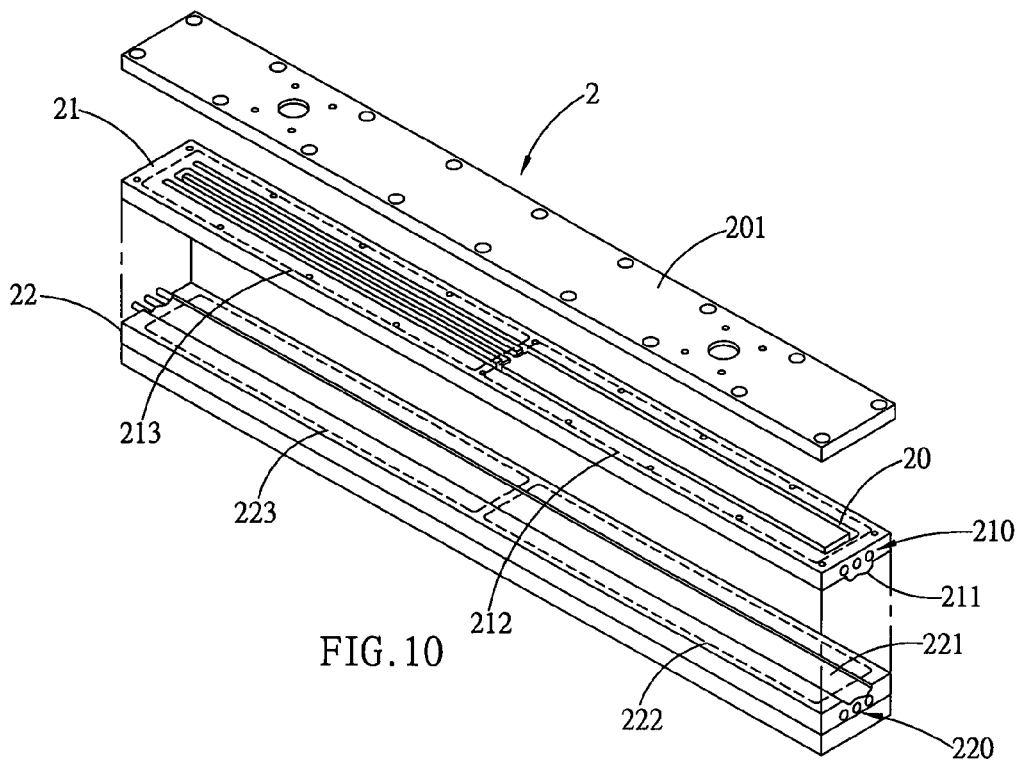
FIG. 10 shows a three-dimensional schematic view of the structure of the hot ironing module of the present invention.

Referring to FIG. 10, the hot ironing module 2 provided by the present invention is constituted by pairing the first upper mold block 21 with the first lower mold block 22. Each opposite surface is provided with the corresponding curved first male rail 211 and first female slot 221. The first male rail 211 and the first female slot 221 have to gain heat energy which is obtained from a neighboring dispersion path 20. In addition, the energy, which is hot temperature, required by the hot ironing module 2, can be guided in respectively from the coupling end 210, 220. This energy is distributed in surfaces to the first male rail 211 or the first female slot 221 from the dispersion path 20 which dissipates the energy, allowing that the heat energy can be fetched at a location in adjacent to the thickness on the longitudinal surface of the first male rail 211 or the first female slot 221. That energy can be obtained through an electrothermal method, such as using electrothermal tubes or a constant temperature heater with a ceramic resistor of a positive temperature coefficient (not shown in the drawing), or by exchanging heat with a stream of thermal oil. In the case of thermal oil, an interior of the thermal oil can be filled with a boosting agent, which is heat-carrying metal particles of high enthalpy, to improve a heat exchange rate.

The dispersion path 20 enters from the coupling ends 210, 220 into the first upper mold block 21 or the first lower mold block 22. In adjacent to an interior of the first male rail 211 or the first female slot 221, the dispersion path 20 is a piping which can be formed by sealing with a molding board 201, as sealing with an end surface of the molding board 201 facilitates opening the dispersion path 20. Furthermore, if the feed-in end of the strip material 600 is adjacent to a side of the coupling end 210, 220 (as shown in FIG. 2), then the strip material 600 is able to receive hot temperature in the beginning. However, in order to achieve a progressive effect, the temperature at which the strip material 600 starts to enter should not be too high, preventing the elements of plasticized material from degradation due to a rapid change of temperature. Therefore, a method of progressive increase is used, wherein locations adjacent to the coupling ends 210, 220 are configured as first heat conduction zones 212, 222, and tail ends are configured as second heat conduction zones 213, 223. The heat energy exchanged at the second heat conduction zones 213, 223 is larger than that at the first heat conduction zones 212, 222. Accordingly, after entering, the strip material 600 will be heated up gradually and a full temperature operation will be implemented in the second heat conduction zones 213, 223.

The operated strip material 600 (as shown in FIG. 2) is formed by dipping the fabric into a plasticized adhesive agent, followed by setting and cutting into strips. Gaps in the fiber are filled with the thermoplastic material which is stable under a normal temperature. The strip material 600 will be thermally deformed under high temperature and during the deformation process, heat mass will be progressively transmitted from an outer surface to a core, which takes time. The object of this progressive heat-up is to allow the outer surface to be pre-heated first. The temperature obtained is then transmitted to the core of strip material 600 and when the second heat conduction zones 213, 223 receive the full temperature which is transmitted to the core, the core has already been pre-heated in advance. Therefore, when the strip material 600 receives the high temperature again, the element structures have already accomplished preparation of deformation, allowing that the heat-up process will not be too aggressive, which avoids embrittlement to the structures of the plasticized material.

Figure 9:
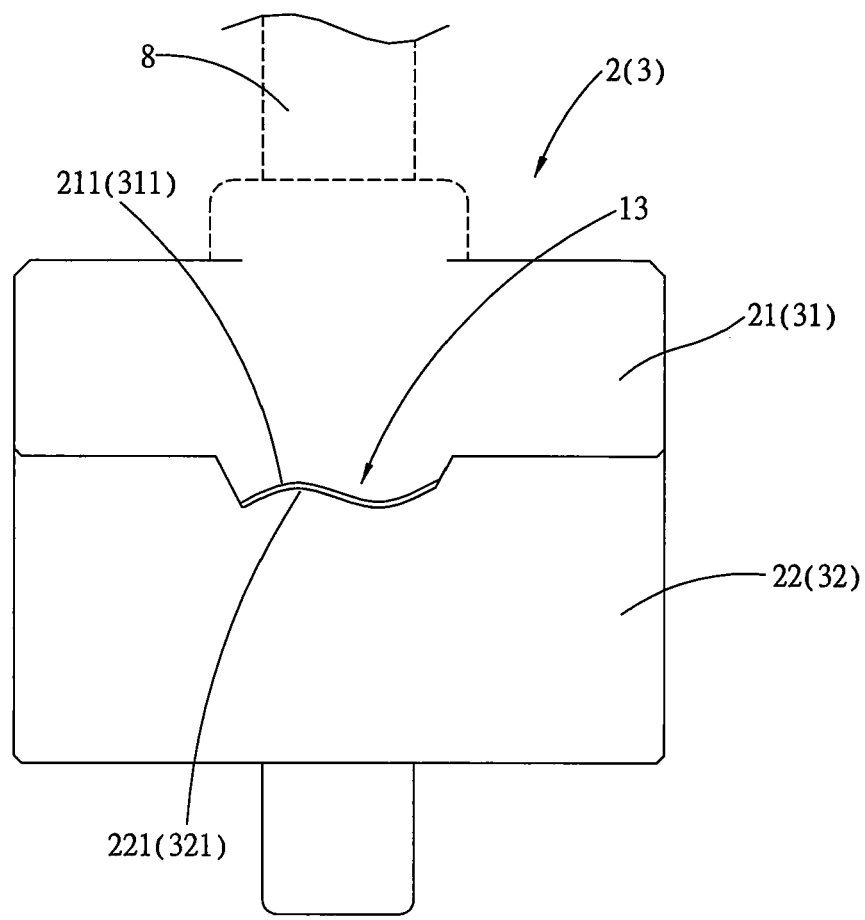
FIG. 9 shows a side view of the hot ironing module and the cold ironing module after being assembled, according to the present invention.

Through the complete procedure of hot ironing with surface contact of the first male rail 211 and the first female slot 221, in addition to that the temperature can be exchanged uniformly, a mechanical restraining force is formed using the curved cross section of the through-slot 13 which is formed by pairing the first male rail 211 with the first female slot 221 (as shown in FIG. 9); this mechanical restraining force mandatorily enables the strip material 600 to undergo the hot-working process. When the strip material 600 is not completely thermally fused, the curve of the through-slot 13 will first make a required curvature on the surface of the strip material 600 which is half thermally fused. At this time, as the strip material 600 still keeps a structural force to result in a resistant stress (this stress exists before the plasticized material is completely thermally fused), the stress occurs in the through-slot 13 and then after through the full thermal fusion in the second heat conduction zones 213, 223, the binding force of the plasticized elements maintaining the abovementioned stress will be collapsed and dissipated, allowing the deformation force to be completely removed and also achieving a pre-styling of forming in advance.

The abovementioned pre-styling has accomplished the primary work of shaping, which is followed by connecting with the cold ironing module 3 to execute the cold shaping again.

An end of the through-slot 13 relative to an entrance of the strip material 600 can be configured as an oblique edge which expands outward. This purpose is to prevent the surface of the entered strip material 600 from being cut and scraped by corners of the entrance.

Figure 11:
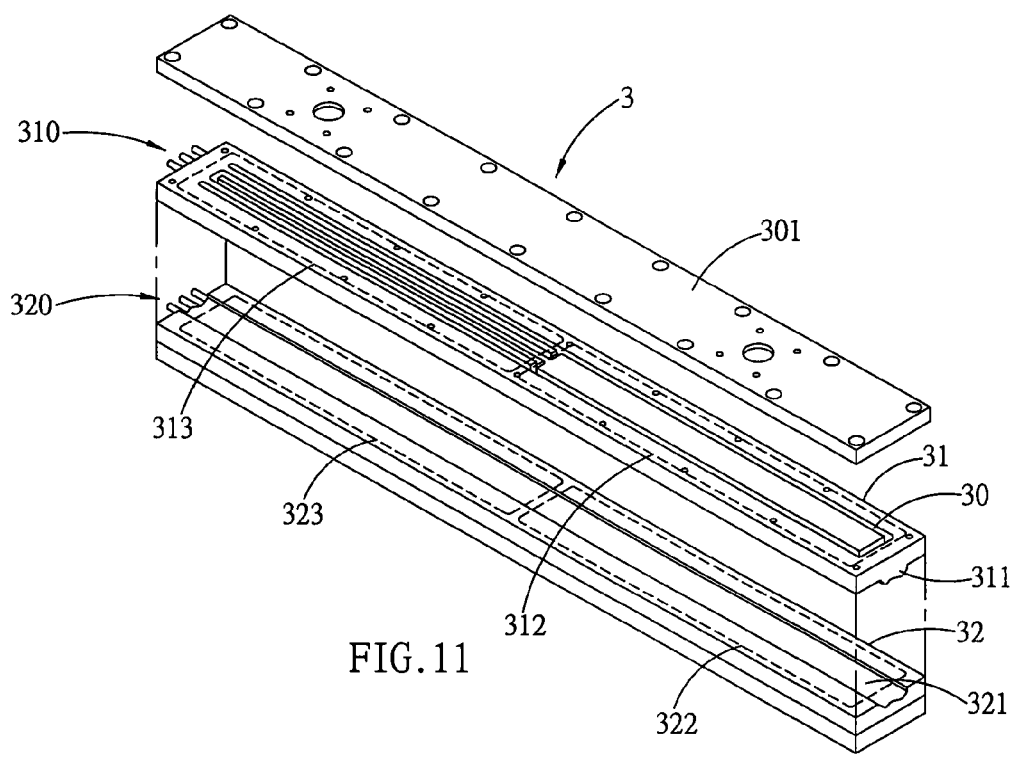
FIG. 11 shows a three-dimensional schematic view of the structure of the cold ironing module of the present invention.

Referring to FIG. 11, the cold ironing module 3 of the present invention executes a cooling work to cool down the strip material 600 after hot ironing by the hot ironing module 2. The cold ironing module 3 is also formed by pairing the second upper mold block 31 with the second lower mold block 32. The corresponding linear positions of the second upper mold block 31 and the second lower mold block 32 are similarly provided with a curved second male rail 311 and second female slot 321. The second upper mold block 31 and the second lower mold block 32 require low temperature and heat can be exchanged out by feeding in refrigerant or cooling water. An exchange passage is formed through the streamlined dispersion path 30 to exchange the heat that is received by the second male rail 311 and the second female slot 321 and then exchanged out from the coupling ends 310, 320.

The dispersion path 30 can be similarly formed by covering with a molding board 301, like a profile of the hot ironing module 2. Therefore, if both the hot ironing module 2 and the cold ironing module 3 use fluid as a thermal medium, then the structure elements and sizes of the two modules will be the same; this will facilitate manufacturing the hot ironing module 2 and the cold ironing module 3 to simplify production and reduce backlog.

In the cooling concept of the cold ironing module 3, a similar consideration of progressive temperature change is available, wherein first cold conduction zones 312, 322 and second cold conduction zones 313, 323 are provided. As temperature of the second cold conduction zones 313, 323 is lower than that of the first cold conduction zones 312, 322, when the strip material 600 that has undergone the abovementioned hot ironing process enters between the second male rail 311 and the second female slot 321, it will be cooled down slowly by the higher temperature of the first cold conduction zones 312, 322 at upstream. When the strip material 600 reaches the second cold conduction zones 313, 323, it will be fully cooled down by the lower temperature, forming a progressive change of temperature and a long cold ironing of full surface contact. Accordingly, the structure crystalline of the deformed and plasticized elements of the outputted product of formation will be accurately positioned, allowing the product to be stable.

Referring to FIG. 1, as the hot ironing module 2 of the present invention is under high temperature, its outer surface can be provided with insulation sheaths 202, 203 to isolate heat on the outer surfaces of the first upper mold block 21 and the first lower mold block 22 (as shown in FIG. 2). The first lower mold block 22 and the second mold block 32 of the hot ironing module 2 and the cold ironing module 3 can be placed above the platform 100 by latching and positioning. Therefore, the hot-working assembly 1 of a different curvature or shape can be replaced quickly to provide the products of various shapes.

Figure 12:
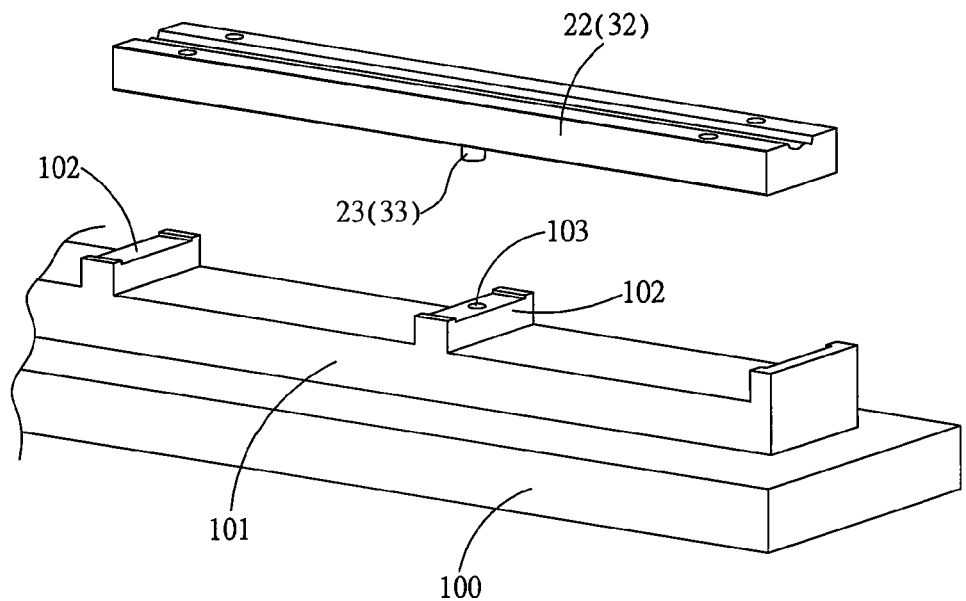
FIG. 12 shows a schematic view of latching a lower mold block, according to the present invention.
Figure 13:
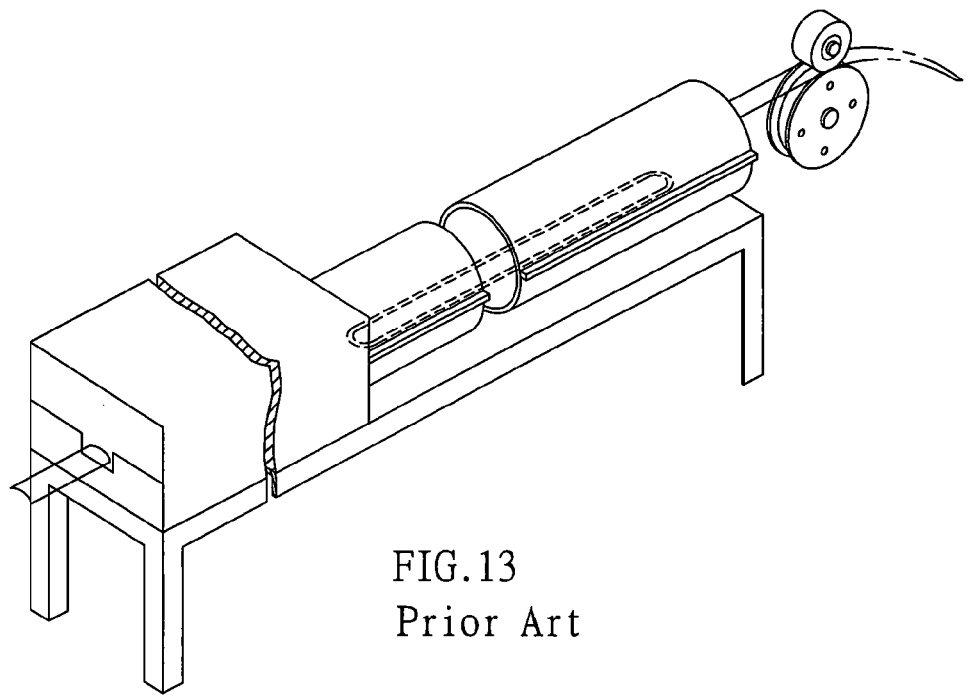
FIG. 13 shows a drawing of the Taiwanese patent No. 81202945.

For convenience in latching the first lower mold block 22 and the second lower mold block 32, at least the first lower mold block 22, and heat insulation, an upper surface of the platform 100 is first provided with a cross seat 101 (as shown in FIG. 12). An upper surface of the cross seat 101 is protruded at least with two cross ties 102, providing for crossing and positioning of bottom surfaces of the first lower mold block 22 and the second mold block 32. The first lower mold block 22 and the second mold block 32 can be further provided with positioning tenons 23, 33 which are inserted into positioning holes 103 of the cross seat 101, thereby achieving the explicit positioning and quick latching.

Referring to FIG. 1 again, along with FIGS. 10 and 11, the present invention provides the sequentially operated hot-working assembly 1, the through-slot 13 (as shown in FIG. 9) of which is provided upstream and downstream with the operations of hot ironing at higher temperature and cold ironing at lower temperature. Besides, each of the hot ironing module 2 and the cold ironing module 3 is provided with the conduction zones of progressive temperature in the upstream and downstream sections. Therefore, in the beginning when the strip material 600 enters into the through-slot 13, it is pre-heated by lower temperature. When entering into the second heat conduction zone of the hot ironing module 2, the strip material 600 is operated at full temperature with the thermal deformation; whereas, the first male rail 211 and the first female slot 221 of the hot ironing module 2 can contact in surface with the upper and lower outer surfaces of the strip material 600, allowing the entire surface of the strip material 600 to be ironed during the hot ironing process. Accordingly, the temperature received by the strip material 600 will be uniform in the complete procedure. Next, the strip material 600 is subjected to the cold shaping by the cold ironing module 3 which is similarly provided with the first cold conduction zone and the second cold conduction zone. In the beginning when the strip material 600 that has undergone the abovementioned hot ironing process enters into the cold ironing module 3, the cold ironing at higher cold temperature will be executed. Finally, the full cooling will be implemented by the second cold conduction zone. In addition, during the process, the second male rail 311 and the second female slot 321 of the cold ironing module 3 are similarly in contact by the entire surface with the upper and lower surfaces of the strip material 600 to achieve the complete procedure of cold formation by the cold ironing with the entire surface being pressed. By the hot-working and cold-working processes of the full surface contact, the strip material 600 which displaces relatively to pass through the through-slot 13 can be heated up uniformly during the hot-working process and can be uniformly subjected to the cold ironing operation by the relative surfaces of the second male rail 311 and the second female slot 321 of the through-slot 13 during the cooling process. Accordingly, the plasticized elements can change progressively and finally the explicit and stable styling can be achieved, such that the formed material can be provided with a stable mechanical stress and the plasticized slat can be formed stably and quickly.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A forming machine for fabric slats, thermally forming a slat of a curved cross section according to temperature, comprising:

a hot-working assembly, which is constituted by connecting longitudinally a hot ironing module at an upstream end with a cold ironing module at a downstream end and an interior of which is formed longitudinally with a linear through-slot of a curved cross section from upstream to downstream, an end of the through-slot at the hot ironing module being a feed-in end and a take-up end being at a downstream end of the cold ironing module, thereby providing access of a strip material to be formed;

the hot ironing module which is constituted by linearly pairing a first upper mold block with a first lower mold block, a longitudinal surface of the first upper mold block being provided with a first linear male rail and a longitudinal surface of the first lower mold block being provided with a corresponding first linear female slot;

the cold ironing module which is constituted by linearly pairing a second upper mold block with a second lower mold block, a longitudinal surface of the second upper mold block being provided with a second linear male rail and a longitudinal surface of the second lower mold block being provided with a corresponding second linear female slot, a linear hot-work forming through-slot being serially connected from upstream to downstream and penetrating the hot-working assembly after pairing the first and second upper and lower mold blocks of the hot ironing module and the cold ironing module respectively, interiors of the hot ironing module and the cold ironing module being provided respectively with a dispersion path to disperse temperature and the dispersion path quickly conducting temperature acquired to surfaces of the respective male rails and female slots;

a feed device which is provided at a feed-in opening of the hot-working assembly; and a take-up device which is provided at a take-up opening of the hot-working assembly.

2. The forming machine for fabric slats according to claim 1, wherein the dispersion path is provided inside the first and second upper mold blocks and the first and second lower mold block.

3. The forming machine for fabric slats according to claim 1, wherein the hot working module and the cold working module are provided respectively with a first heat conduction zone and a second heat conduction zone along a direction of the hot-work forming through-slot, temperature of the second heat conduction zones being larger than that of the first heat conduction zones.

4. The forming machine for fabric slats according to claim 3, wherein the first heat conduction zones and the second heat conduction zones exchange heat through the dispersion path which accesses energy outward through coupling ends, the energy being fluid.

5. The forming machine for fabric slats according to claim 4, wherein if the fluid is thermal oil or cold water, then its interior is filled with a boosting agent which is heat-carrying metal particles or ethylene glycol.

6. The forming machine for fabric slats according to claim 1, wherein the first upper mold block of the hot ironing module and the second upper mold block of the cold ironing module are linked synchronously by a lifting mechanism.

7. The forming machine for fabric slats according to claim 1, wherein the feed device and the take-up device are linked respectively to a shear wheel by an electric drive unit and two sides of a wheel surface of the shear wheel are provided with side carriages to clamp a wheel surface of a clamp wheel, a clamping force of the clamp wheel being adjusted by a push device.

8. The forming machine for fabric slats according to claim 1, wherein the feed device is provided with a shear wheel and a seat and a wheel surface of the shear wheel is provided with a conjugate curve which is symmetric to a wheel surface of the clamp wheel.

9. The forming machine for fabric slats according to claim 1, wherein the feed device is connected with a dispensing device to access the strip material continuously and the dispensing device is assembled at a seat and is provided with a pivot which is sheathed by a beam-barrel at a center position of a feed roll rolled by the strip material, the pivot rotating to allow the feed roll to dispense the strip material, an end of the pivot being connected to a brake disc and a running speed of the brake disc being restricted by a clamp device which operates by an instruction of a sensor unit that detects a change of diameter of the feed roll.

10. The forming machine for fabric slats according to claim 9, wherein the sensor unit is assembled at the seat and is provided with an offset probe and a tail end of which is abutted tangentially at an outer circumference of the feed roll, a diameter of the feed roll being decreased when the strip material is dispensed that the probe results in an offset to adjust resistance of a rheostat, the rheostat changing a signal of the resistance which activates the sensor unit to notify the clamp device to work correspondingly, thereby controlling tension of the strip material after being dispensed.

11. The forming machine for fabric slats according to claim 10, wherein the offset of the probe is an angular change and the rheostat is effectively operated through a link element which is a gear of large diameter and results in an angular momentum by the offset of the probe, the link element gnawing a passive element of small diameter and the passive element linking coaxially with a spindle of the rheostat to enlarge a rotation angle of the rheostat.

12. The forming machine for fabric slats according to claim 1, wherein the feed-in end of the through-slot of the hot-working assembly receives the strip material through guidance of a plate gauge which supports an end surface of the feed roll.

* * * * *